United States Patent [19]
Adam

[11] Patent Number: 5,027,670

[45] Date of Patent: Jul. 2, 1991

[54] MOTOR VEHICLE WINDOW-LIFTING DRIVE

[75] Inventor: Peter Adam, Hte,uml/o/ chberg, Fed. Rep. of Germany

[73] Assignee: Siemens Aktiengesellschaft, Berlin & Munich, Fed. Rep. of Germany

[21] Appl. No.: 473,355

[22] Filed: Feb. 1, 1990

[30] Foreign Application Priority Data

Mar. 23, 1989 [EP] European Pat. Off. ........ 89105279.7

[51] Int. Cl.[5] ........................ F16H 1/16; B65D 53/00

[52] U.S. Cl. ........................................ 74/425; 74/505; 277/225

[58] Field of Search ....................... 74/89.14, 425, 505; 277/225, 231

[56] References Cited

U.S. PATENT DOCUMENTS

| | | | |
|---|---|---|---|
| 4,235,117 | 11/1980 | Pickles | 74/89 |
| 4,367,660 | 1/1983 | Becker et al. | 74/425 X |
| 4,428,250 | 1/1984 | Becker et al. | 74/425 |
| 4,643,040 | 2/1987 | Adam et al. | 74/425 |
| 4,770,056 | 9/1988 | Becker et al. | 74/505 |

FOREIGN PATENT DOCUMENTS

| | | |
|---|---|---|
| 2952408 | 7/1981 | Fed. Rep. of Germany . |
| 3027154 | 2/1982 | Fed. Rep. of Germany . |
| 3325837 | 2/1985 | Fed. Rep. of Germany . |
| 3438754 | 5/1985 | Fed. Rep. of Germany . |
| 8138613 | 7/1986 | Fed. Rep. of Germany . |
| 3519056 | 12/1986 | Fed. Rep. of Germany . |

*Primary Examiner*—Allan D. Herrmann
*Assistant Examiner*—David W. Laub
*Attorney, Agent, or Firm*—Kenyon & Kenyon

[57] ABSTRACT

In a window-lifting actuating drive where two cup-shaped housings enclose a driven worm gear coupled to a cable pulley, a flat seal is configured to seal the worm gear housing from ambient moisture both at the joint between the two housings and between the cable pulley housing and the worm gear. The flat seal is also formed to allow the seal to be prefit to the cable pulley housing and retained to the housing before the housing is assembled to other components of the actuating drive.

21 Claims, 1 Drawing Sheet

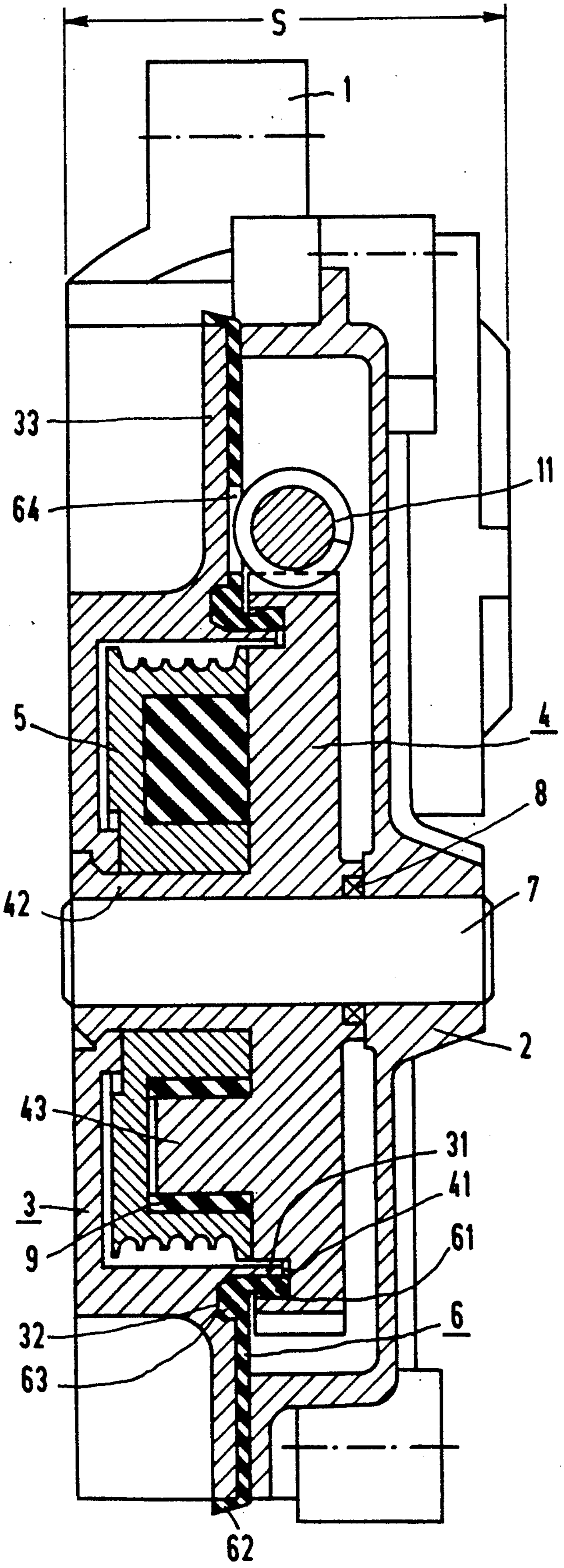
S
1
33
64
11
5
4
8
42
7
2
43
31
41
3
61
9
6
32
63
62

MOTOR VEHICLE WINDOW-LIFTING DRIVE

BACKGROUND OF THE INVENTION

The present invention relates to the field of actuating drives. More specifically it relates to actuating drives for lifting motor vehicle windows.

An actuating drive of this general type is disclosed in unpublished European Patent Application No. 88116226.7. That actuating drive includes two axially-joined, cup-shaped housings: a gear housing and a cable pulley housing. The gear housing houses a worm gear turned by a worm shaft, which is in turn powered by a driving motor. The cable pulley housing houses a pulley for a cable attached to the motor vehicle window mechanism. The gear housing is sealed by a separate housing cover. Two seal mechanisms are used to seal the interior of the housings. First, a flat seal is assembled between the housing cover and the outer wall of the cable pulley housing. Second, an O-ring seal is assembled between the housing cover and the worm gear. Another O-ring is mounted as an axle seal between the worm gear and its axle.

Although the previously-disclosed actuating drive works quite well and offers numerous advantages, it suffers from several drawbacks. Several of these drawbacks stem from the use of a separate housing cover. The cost of the housing cover increases the cost of the actuating drive, as does the seal required between the housing cover and the worm gear. The use of the housing cover also adds a step to the assembly process, increasing assembly cost. The housing cover adds axial thickness to the actuating drive. Other drawbacks stem from the seals. The assembly process is complicated by the need to properly position the seal with respect to the other actuating drive components during the assembly process. Further, sealing relative to the worm gear can be unreliable with long time periods between actuating drive operation and with extreme temperatures.

Thus, it is evident that there is a need for improved actuating drives which eliminate the housing cover, simplify assembly of the seals with other actuating drive components, and provide reliable sealing over wide temperature ranges and with long time periods between actuating drive operation.

SUMMARY OF THE INVENTION

The present invention provides such an actuating drive. The actuating drive incorporates a one-piece, molded rubber flat seal with an annular sealing lip formed at its inner periphery. The flat seal is arranged between the two housings so that the radially outer portion of the flat seal seals the joint between the two housings while the sealing lip contacts the worm gear at the sealing lip's axial end and radial surface. The worm gear is formed with an annular sealing groove to sealingly receive the sealing lip of the flat seal. The sealing contact between the sealing lip and the sealing groove is enhanced by forming a circumferential supporting rim on the cable pulley housing which protrudes into the sealing groove and presses the sealing lip against the radially outer wall of the sealing groove. This provides reliable sealing between the sealing lip and the worm gear over wide temperature ranges and with long periods between operation of the actuating drive.

The flat seal is also formed with a retaining lip at its outer periphery which snaps over the periphery of a peripheral flange on the cable pulley housing to retain the flat seal on the cable pulley housing before the housing is assembled with other components of the actuating drive. Retention of the flat seal on the cable pulley housing is further enhanced by forming an annular retaining bead on the flat seal which is forced into a corresponding annular retaining groove on the cable pulley housing. The cost of assembly is reduced by having the ability to attach the flat seal to the cable pulley housing before the housing is assembled with other components, avoiding the need for other assembly or adjusting steps to ensure proper seal placement between the two housings.

The flat seal of the present invention eliminates the need for a separate outer housing cover to seal the gear housing. This represents a savings in material and assembly costs in constructing the actuating drive. Eliminating the outer housing cover also allows the axial thickness of the actuating drive to be reduced so that the actuating drive is no thicker than the maximum thickness of the driving motor. The thickness of the actuating drive is further reduced by forming a linear recess in the flat seal to correspond with the worm shaft thereby allowing the worm shaft to be axially displaced closer to the cable pulley housing, breaking the plane of the flat seal.

The invention can also be used in configurations of windowlifting mechanisms other than cable-operated mechanisms, such as crossbar mechanisms in which the cable pulley is replaced by a crossbar drive.

BRIEF DESCRIPTION OF THE DRAWINGS

The single FIGURE is an axial, cross-sectional view of the window-lifting, actuating drive of the invention.

DETAILED DESCRIPTION

The FIGURE shows the actuating drive, mounted on the drive motor flange 1 of a cable-operated window lifter in a motor vehicle. The actuating drive includes two subassemblies mounted to seal axially against each other. One subassembly essentially comprises the drive gear contained in a cup-shaped gear housing, while the other subassembly essentially comprises the cable pulley contained in a cup-shaped cable pulley housing.

The output shaft of the driving motor, which can be an electric motor or the like and is mounted on the drive motor flange 1, terminates in a worm shaft 11. Worm shaft 11 projects radially into gear housing 2 and drivingly engages the periphery of a worm gear 4. Worm gear 4 is rotatably supported on an axle 7 anchored in the center of gear housing 2. A cable pulley 5 is rotatably supported on an axially protruding shank 42 of worm gear 4 and is slaved to the worm gear 4 by axially protruding slaving cams 43 through interposed flexible dampers 9.

The cable pulley housing 3 is cup-shaped with a rim end which in the illustrated embodiment is an axially-facing flange 33 at its periphery and is supported at the inner periphery of a central aperture on the end of the shank 42 of worm gear 4. The cable pulley housing flange 33 is secured to the radially outer edge of the gear housing. The two housings can be secured by an interlocking screw joint, a crimp, or the like.

The joint between the gear housing and the cable pulley housing is sealed by a flat seal 6 with an integral circumferential sealing lip 61. The flat seal blocks two paths for infiltration of moisture from the air outside the actuator drive into the gear housing and (because the gear housing communicates with the driving motor via the aperture in the gear housing through which the worm shaft enters) into the driving motor. Moisture could enter the gear housing through the joint between the two housings. The flat seal 6 blocks this moisture infiltration path by the portion of the flat seal clamped axially between the flange 33 of the cable pulley housing and the edge of the gear housing.

The gear housing and the drive motor could also be penetrated by moisture entering the cable pulley housing via the aperture through which cable is deployed. This second moisture infiltration path is block by sealing the gear housing with respect to the cable pulley housing by the sealing lip 61 of the flat seal 6. Sealing lip 61 sealingly protrudes into a circumferential sealing groove 41 formed near the periphery of worm gear 4. The radially outer face of sealing lip 61 sealingly contacts the radially outer wall of sealing groove 41. The axially outer edge of sealing lip 61 sealingly contacts the bottom surface of sealing groove 41. Sealing lip 61 therefore forms both an axial and a radial seal with sealing groove 41.

In a refinement of the present invention, a circumferential, axially-protruding supporting rim 31 is formed at the radially inner edge of the cable pulley housing flange 33. Supporting rim 31 presses the sealing lip 61 radially outwardly against the radially outer wall of sealing groove 41, thus ensuring a defined high sealing contact pressure over a wide temperature range and with long intervals between actuator drive operation.

A third path for moisture infiltration into the gear housing, through the joint between the worm gear 4 and the axle 7, is blocked by a seal 8, which can be an O-ring or the like.

The flat seal 6 can be formed with a circumferential retaining rim 62 at its periphery. The retaining rim can be snapped over the rim of the cable pulley housing flange 33 to hold the seal in place on the cable pulley housing before assembly of the housing to other components of the actuating drive. In another embodiment, the retaining rim can be formed to snap over the rim of the rim end of the gear housing. The flat seal can also be formed with a circumferential retaining bead 63 radially proximal to the sealing lip 61. The retaining bead can be forced into a corresponding circumferential retaining groove 32 formed in the cable pulley housing 3 to further hold the flat seal in place on the cable pulley housing before further assembly of the actuating drive.

The flat seal 6 can further be formed with a linear recess 64 aligned with the worm shaft 11, thereby allowing the periphery of the worm shaft to break the plane of the flat seal thus reducing the axial thickness of the actuator drive. The axial thickness of the actuating drive can therefore be less than the maximum thickness S of the driving motor.

The invention can also be used in configurations of windowlifting mechanisms other than cable-operated mechanisms, such as crossbar mechanisms in which the cable pulley is replaced by a crossbar drive.

What is claimed is:

1. An actuating drive comprising:

a. a cup-shaped gear housing having a rim end;

b. a worm gear housed within the gear housing;

c. a motor;

d. means drivingly coupled the motor to the worm gear;

e. a cup-shaped cable pulley housing having a rim end and being axially aligned with and coupled at its rim end to the rim end of the gear housing; and f. a flat annular seal having at its inner periphery an axially extending, circumferential sealing lip, the seal being arranged between and sealingly contacting the rim end of the gear housing and the rim end of the cable pulley housing and the sealing lip axially and radially sealing against the worm gear, said seal and sealing lip being formed in a single piece.

2. The actuating drive of claim 1 wherein the flat seal and the sealing lip are molded from rubber in a single piece.

3. The actuating drive of claim 1 wherein the means drivingly coupling the motor to the worm gear is a worm shaft, the worm shaft projects into the gear housing, and the flat seal is formed with a linear recess to accommodate the worm shaft.

4. The actuating drive of claim 1 further including means for securing the flat seal on the rim end of the gear housing.

5. The actuating drive of claim 4 wherein the flat seal and the sealing lip are molded from rubber in a single piece.

6. The actuating drive of claim 4 wherein the flat seal and the rim end of the gear housing are formed with a cooperating projection and recess whereby the flat seal is secured on the rim end of the gear housing.

7. The actuating drive of claim 6 wherein the flat seal and the sealing lip are molded from rubber in a single piece.

8. The actuating drive of claim 1 further including means for securing the flat seal on the rim end of the cable pulley housing.

9. The actuating drive of claim 8 wherein the flat seal and the sealing lip are molded from rubber in a single piece.

10. The actuating drive of claim 8 wherein the means drivingly coupling the motor to the worm gear is a worm shaft, the worm shaft projects into the gear housing, and the flat seal is formed with a linear recess to accommodate the worm shaft.

11. The actuating drive of claim 8 wherein the flat seal and the rim end of the cable pulley housing are formed with a cooperating projection and recess whereby the flat seal is secured on the rim end of the cable pulley housing.

12. The actuating drive of claim 11 wherein the flat seal and the sealing lip are molded from rubber in a single piece.

13. The actuating drive of claim 11 wherein the means drivingly coupling the motor to the worm gear is a worm shaft, the worm shaft projects into the gear housing, and the flat seal is formed with a linear recess to accommodate the worm shaft.

14. The actuating drive of claim 8 wherein the worm gear has a circumferential sealing groove having a radially inner side wall, a radially outer side wall, and an annular bottom surface between the inner side wall and the outer side wall and the sealing lip projects into the sealing groove and sealingly contacts the annular bottom surface and at least one of the inner side wall or outer side wall.

15. The actuating drive of claim 14 wherein the means drivingly coupling the motor to the worm gear is a worm shaft, the worm shaft projects into the gear housing, and the flat seal is formed with a linear recess to accommodate the worm shaft.

16. The actuating drive of claim 14 wherein the cable pulley housing has an axially protruding supporting rim which protrudes into the sealing groove and the sealing lip is radially supported by the supporting rim.

17. The actuating drive of claim 16 wherein the means drivingly coupling the motor to the worm gear is a worm shaft, the worm shaft projects into the gear housing, and the flat seal is formed with a linear recess to accommodate the worm shaft.

18. The actuating drive of claim 8 wherein the securing means comprises a circumferential retaining rim formed on the flat seal and the retaining rim grips the radially outer edge of the cable pulley housing.

19. The actuating drive of claim 18 wherein the means drivingly coupling the motor to the worm gear is a worm shaft, the worm shaft projects into the gear housing, and the flat seal is formed with a linear recess to accommodate the worm shaft.

20. The actuating drive of claim 8 wherein the cable pulley housing has an annular retaining groove formed on the side axially proximal to the flat seal and the flat seal has a premolded axially-projecting, annular retaining bead located radially near the sealing lip which can be engaged with, and retained in, the retaining groove before assembly of other actuating drive components to the cable pulley housing.

21. The actuating drive of claim 20 wherein the means drivingly coupling the motor to the worm gear is a worm shaft, the worm shaft projects into the gear housing, and the flat seal is formed with a linear recess to accommodate the worm shaft.

* * * * *